(12) United States Patent
Chen (10) Patent No.: US 12,417,887 B2
(45) Date of Patent: Sep. 16, 2025

(54) BUTTON AND ELECTRONIC DEVICE (71) Applicant: HONOR DEVICE CO., LTD., Shenzhen (CN)

(72) Inventor: Ronggang Chen, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 34 days.

(21) Appl. No.: 18/032,315

(22) PCT Filed: Aug. 17, 2022

(86) PCT No.: PCT/CN2022/112972
§ 371 (c)(1),
(2) Date: Apr. 17, 2023

(87) PCT Pub. No.: WO2023/029996
PCT Pub. Date: Mar. 9, 2023

(65) Prior Publication Data
US 2023/0395337 A1    Dec. 7, 2023

(30) Foreign Application Priority Data
Sep. 6, 2021   (CN) .......................... 202111037450.4

(51) Int. Cl.
*H04M 1/18*     (2006.01)
*H01H 13/14*    (2006.01)
*H04M 1/02*     (2006.01)

(52) U.S. Cl.
CPC .......... *H01H 13/14* (2013.01); *H04M 1/0274* (2013.01); *H04M 1/0277* (2013.01)

(58) Field of Classification Search
CPC .. H04M 1/236; H04M 1/0274; H04M 1/0277; H01H 13/04; H01H 2221/016; H01H 2223/04; H01H 13/14
(Continued)

(56) References Cited

U.S. PATENT DOCUMENTS 9,053,878 B2    6/2015   Kim
2008/0088489 A1*   4/2008   Moon .................... H01H 25/00
                                                    341/22

(Continued)

FOREIGN PATENT DOCUMENTS

CN    203399153 U    1/2014
CN    105120041 A    12/2015
(Continued)

OTHER PUBLICATIONS

IP.com search history (Year: 2025).*

*Primary Examiner* — Moustapha Diaby
(74) *Attorney, Agent, or Firm* — WOMBLE BOND DICKINSON (US) LLP (57) ABSTRACT

This application provides a button, at least a part of an end of an inner button close to an outer button is built into the outer button, the inner button is disposed on a back surface of the outer button, a size of the outer button in a width direction of the button is the same as a size of at least a part of a function part of the inner button in the width direction of the button, one outer side wall of the outer button in a length direction of the button is flush to one outer side wall of the function part in the length direction of the button, and the other outer side wall of the outer button in the length direction of the button is flush to the other outer side wall of the function part in the length direction of the button.

20 Claims, 6 Drawing Sheets

(58) Field of Classification Search
USPC .................................................. 455/575.1
See application file for complete search history.

(56) References Cited

U.S. PATENT DOCUMENTS

| | | | | |
|---|---|---|---|---|
| 2009/0159416 | A1* | 6/2009 | Tseng | H01H 13/86 200/341 |
| 2010/0067204 | A1* | 3/2010 | Li | H04M 1/0277 361/752 |
| 2014/0031093 | A1* | 1/2014 | Song | H04M 1/0249 455/575.1 |
| 2014/0126163 | A1* | 5/2014 | Kim | H04M 1/0274 361/752 |
| 2014/0302705 | A1* | 10/2014 | Park | H04M 1/236 439/660 |
| 2015/0173245 | A1* | 6/2015 | Chung | H04M 1/0277 361/752 |

FOREIGN PATENT DOCUMENTS

| | | |
|---|---|---|
| CN | 205069451 U | 3/2016 |
| CN | 105786283 A | 7/2016 |
| CN | 106098445 A | 11/2016 |
| CN | 106161702 A | 11/2016 |
| CN | 108882592 A | 11/2018 |
| CN | 106504926 B | 8/2019 |
| CN | 209488661 U | 10/2019 |
| CN | 209748949 U | 12/2019 |
| CN | 110149437 B | 11/2020 |
| CN | 211928482 U | 11/2020 |
| CN | 112216545 A | 1/2021 |
| CN | 112490042 A | 3/2021 |
| CN | 212909612 U | 4/2021 |
| CN | 112908759 A | 6/2021 |
| CN | 113972082 A | 1/2022 |
| KR | 20140057826 A | 5/2014 |

* cited by examiner

BUTTON AND ELECTRONIC DEVICE

CROSS-REFERENCE TO RELATED APPLICATIONS

This application is a national stage of International Application No. PCT/CN2022/112972, filed on Aug. 17, 2022, which claims priority to Chinese Patent Application No. 202111037450.4, filed on Sep. 6, 2021. The disclosures of both of the aforementioned applications are hereby incorporated by reference in their entireties.

TECHNICAL FIELD

Embodiments of this application relate to the field of terminal technologies, and in particular, to a button and an electronic device.

BACKGROUND

At present, electronic devices such as computers and mobile phones are inseparable from our lives, can be seen everywhere in our lives, and greatly improve people's living standards. As a use requirement of a consumer constantly increases, and a requirement on the electronic device also constantly increases, a light and thin electronic device gradually attracts attention from people.

The mobile phone is used as an example. As curved shapes of a screen of the mobile phone and a battery cover of the mobile phone are increasingly common, appearance space of a middle frame of the mobile phone is severely compressed, and a side button of the mobile phone becomes a bottleneck of narrowing the middle frame of the mobile phone. In a related technology, to prevent the side button of the mobile phone from affecting a size of the middle frame of the mobile phone, a design that a virtual side button replaces a physical side button is generally used.

However, in the foregoing solution of using the virtual side button, sensitivity of the virtual side button is low, and the virtual side button is prone to failure. This greatly affects user experience.

SUMMARY

This application provides a button and an electronic device, so that a problem that user experience is greatly affected because a button is insensitive or even fails can be avoided while an impact caused on a size of a middle frame of a mobile phone is reduced or eliminated.

According to a first aspect, an embodiment of this application provides a button, applied to an electronic device, where the button includes at least an inner button and an outer button, where at least a part of an end of the inner button close to the outer button is built into the outer button; the outer button includes a pressing surface and a back surface opposite to the pressing surface, and the inner button is disposed on the back surface of the outer button; the inner button includes at least a function part, and a size of the outer button in a width direction of the button is the same as a size of at least a part of the function part in the width direction of the button; and one outer side wall of the outer button in a length direction of the button is flush to one outer side wall of the function part in the length direction of the button, and the other outer side wall of the outer button in the length direction of the button is flush to the other outer side wall of the function part in the length direction of the button.

In the button provided in this embodiment of this application, the inner button is disposed on the back surface of the outer button, and the size of the outer button in the width direction of the button is the same as the size of at least a part of the function part of the inner button in the width direction of the button, that is, a side edge of the outer button is flush to a side edge of the at least a part of the function part of the inner button. Therefore, an overall width of the button can be reduced to a maximum degree. In this way, a size of the button in a thickness direction of the electronic device can be reduced, so that a design size of the button on a middle frame can be reduced, and an impact caused on a size of the middle frame of the electronic device can be reduced or eliminated, to help reduce a size of the middle frame in the thickness direction of the electronic device, and implement lightening and thinning of the entire electronic device. In addition, with the foregoing disposition, the following problem in a conventional technology can be avoided: When a virtualized fingerprint recognition button is used, the button is insensitive or even fails, and user experience is greatly affected.

In addition, the end of the inner button close to the outer button is partially built into the outer button, to ensure reliability when the inner button cooperates with the outer button, and avoid separation between the inner button and the outer button. Compared with the manner in which the end of the inner button close to the outer button is partially built into the outer button, the end of the inner button close to the outer button is totally built into the outer button, to ensure reliability to a larger degree when the inner button cooperates with the outer button, and further avoid separation between the inner button and the outer button. The two outer side walls of the outer button in the length direction of the button are flush to the two outer side walls of the function part of the inner button in the length direction of the button, to ensure that the size of the outer button in the width direction of the button is the same as the size of the function part of the inner button in the width direction of the button. Therefore, the overall width of the button can be reduced to a maximum degree. In this way, the size of the button in the thickness direction of the electronic device can be reduced, so that the design size of the button on the middle frame can be reduced.

In a possible implementation, the inner button further includes a first connection part, one end of the first connection part is connected to the function part, and the other end of the first connection part is connected to a middle frame of the electronic device. The first connection part is disposed, so that the inner button can be connected to the middle frame.

In a possible implementation, the inner button further includes a second connection part, one end of the second connection part is connected to the function part, and the other end of the second connection part is connected to the first connection part. The second connection part can increase connection stability between the function part and the first connection part.

In a possible implementation, a size of the second connection part in the width direction of the button is less than or equal to a size of the function part in the width direction of the button. In this way, it can be ensured that the function part serves as a unit with a largest size in the inner button in the width direction of the button, to prevent the second connection part from increasing an overall width of the inner button.

In a possible implementation, a distance between the outer side wall of the function part in the length direction of the button and the outer side wall of the outer button in the length direction of the button is less than a distance between an outer side wall of the second connection part in the length direction of the button and the outer side wall of the outer button in the length direction of the button.

In other words, the size of the second connection part in the width direction of the button is less than the size of the function part in the width direction of the button. In this way, when the outer side wall of the function part in the length direction of the button is flush to the outer side wall of the outer button in the length direction of the button, in the width direction of the button, an interval exists between the outer side wall of the second connection part in the length direction of the button and the outer side wall of the outer button in the length direction of the button, and the interval forms, on a surface of the outer button that faces the inner button, a step surface for sealing.

In a possible implementation, at least one gap is disposed on at least one outer side wall of an end of the second connection part close to the function part in the length direction of the button, so that at least a part of the back surface at a location at which the outer button is opposite to the first connection part is exposed. At least a part of the back surface at the location at which the outer button is opposite to the first connection part is exposed, and a region exposed on the back surface of the outer button may be used for sealing.

In a possible implementation, a bottom wall of the gap is an inclined surface. The bottom wall of the gap is set as an inclined surface, so that feasibility of a sealing process can be increased.

In a possible implementation, the size of the outer button in the width direction of the button is less than 1.5 mm.

According to a second aspect, an embodiment of this application provides an electronic device, where the electronic device includes at least a middle frame, a circuit board, and at least one button according to any one of the foregoing implementations. An inner button of the button is connected to the middle frame. The electronic device further includes a flexible circuit board, and the inner button is electrically connected to the circuit board by using the flexible circuit board.

In the electronic device provided in this embodiment of this application, the electronic device includes at least a button. In the button, an inner button is disposed on a back surface of an outer button, and a size of the outer button in a width direction of the button is the same as a size of at least a part of a function part of the inner button in the width direction of the button, that is, a side edge of the outer button is flush to a side edge of the at least a part of the function part of the inner button. Therefore, an overall width of the button can be reduced to a maximum degree. In this way, a size of the button in a thickness direction of the electronic device can be reduced, so that a design size of the button on the middle frame can be reduced, and an impact caused on a size of the middle frame of the electronic device can be reduced or eliminated, to help reduce a size of the middle frame in the thickness direction of the electronic device, and implement lightening and thinning of the entire electronic device. In addition, with the foregoing disposition, the following problem in a conventional technology can be avoided: When a virtualized fingerprint recognition button is used, the button is insensitive or even fails, and user experience is greatly affected.

In a possible implementation, the electronic device further includes at least one button switch, the button switch is electrically connected to the flexible circuit board, and the button switch cooperates with the button. In this way, the button switch may be triggered by pressing or touching the button. In addition, the button switch is electrically connected to the flexible circuit board, and the flexible circuit board is electrically connected to the circuit board, so that an electrical connection between the button switch and the circuit board can be ensured, so as to ensure use performance of the button switch.

In a possible implementation, there are two buttons, one of the buttons is opposite to one of the button switches, and two ends of the other of the buttons are respectively opposite to the two button switches.

In a possible implementation, the middle frame includes a middle plate and a frame connected to the middle plate; and at least one opening is disposed on the frame, and the button is located at the opening. In this way, the button may penetrate through the opening, and an end of the button that faces away from the frame may be exposed.

In a possible implementation, the frame includes a top edge, a bottom edge, a left edge, and a right edge that are connected to each other; and the opening is disposed on one of the left edge and the right edge.

DESCRIPTIONS OF REFERENCE NUMERALS

200—mobile phone; 110—display screen; 1101—hole;
120—middle frame; 121—metal middle plate; 122—frame;
1221—top edge; 1222—bottom edge; 1223—left edge;
1224—right edge; 1225—opening; 130—circuit board;
140—battery; 150—rear cover; 160a—front-facing camera module;
160b—rear-facing camera module; 100—button; 10—inner button;
101—function part; 1011—outer side wall of the function part; 102—first connection part;
103—second connection part; 1031—outer side wall of the second connection part; 1032—gap;
1033—bottom wall of the gap; 20—outer button; 201—pressing surface;
202—back surface; 2021—exposed region; 203—outer side wall of the outer button;
L3—width of the outer button; L4—width of the function part.

DESCRIPTION OF EMBODIMENTS

Terms used in implementations of this application are only used to explain specific embodiments of this application, and are not intended to limit this application. The following describes in detail implementations of the embodiments of this application with reference to the accompanying drawings.

Embodiments of this application provide an electronic device that may include but is not limited to a mobile or fixed terminal having a button, for example, a mobile phone, a tablet computer, a notebook computer, an ultra-mobile personal computer (ultra-mobile personal computer, UMPC), a handheld computer, a walkie-talkie, a netbook, a point of sales (Point of sales, POS) terminal, a personal digital assistant (personal digital assistant, PDA), a wearable device, a virtual reality device, a wireless USB flash, a Bluetooth speaker/headset, an in-vehicle front apparatus, an event data recorder, or a security protection device.

Figure 1:
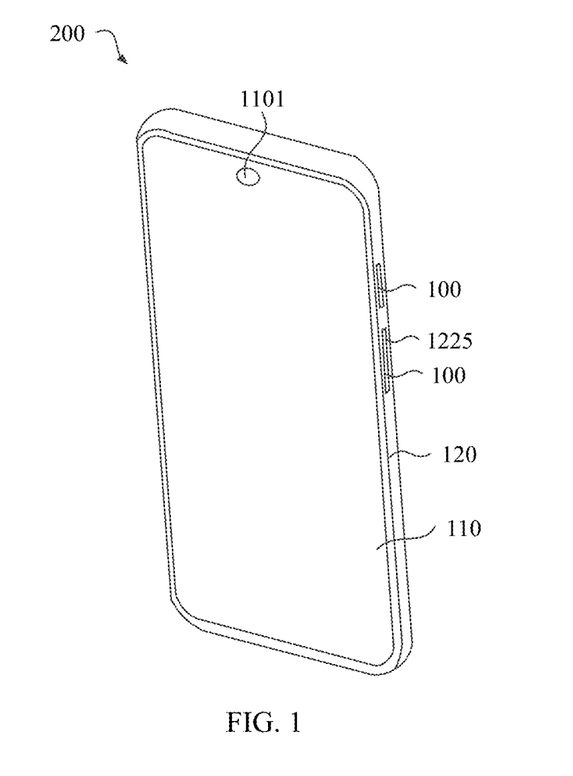
FIG. 1 is a schematic diagram of an overall structure of an electronic device according to an embodiment of this application.
Figure 2:
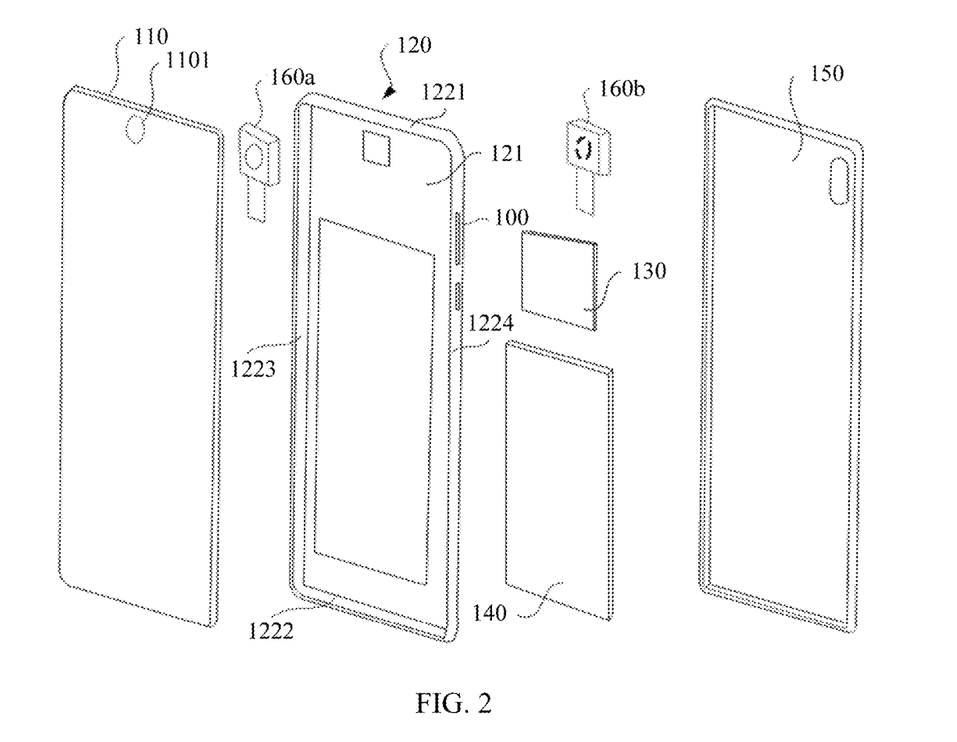
FIG. 2 is a schematic diagram of a breakdown structure of an electronic device according to an embodiment of this application.

An example in which a mobile phone 200 is the foregoing electronic device is used for description. The mobile phone 200 provided in this embodiment of this application may be a curved-screen mobile phone or a flat-screen mobile phone. In this embodiment of this application, the flat-screen mobile phone is used as an example for description. FIG. 1 and FIG. 2 respectively show an overall structure and a breakdown structure of the mobile phone 200. A display screen 110 of the mobile phone 200 provided in this embodiment of this application may be a water drop screen, a bang screen, an all-screen display, or a notch screen (refer to FIG. 1). The following is described by using the notch screen as an example.

In this embodiment of this application, the mobile phone 200 may include at least the display screen 110, a rear cover 150, and a circuit board 130 and a battery 140 that are located between the display screen 110 and the rear cover 150. The battery 140 generally has a battery interface, and the battery interface (not shown in the figure) is electrically connected to the circuit board 130.

In some examples, referring to FIG. 2, the mobile phone 200 may further include a middle frame 120. The circuit board 130 may be disposed on the middle frame 120, for example, the circuit board 130 may be disposed on a surface of the middle frame 120 that faces the rear cover 150 (as shown in FIG. 2), or the circuit board 130 may be disposed on a surface of the middle frame 120 that faces the display screen 110. The display screen 110 and the rear cover 150 are respectively located on two sides of the middle frame 120. The battery 140 may be disposed on the surface of the middle frame 120 that faces the rear cover 150 (as shown in FIG. 2), or the battery 140 may be disposed on the surface of the middle frame 120 that faces the display screen 110. For example, the surface of the middle frame 120 that faces the rear cover 150 may have a battery bin (not shown in the figure), and the battery 140 is mounted in the battery bin.

The battery 140 may be connected to a charging management module and the circuit board 130 by using a power management module. The power management module receives an input of the battery 140 and/or an input of the charging management module, and supplies power to a processor, an internal memory, an external memory, the display screen 110, a camera module, a communication module, and the like. The power source management module may be further configured to monitor parameters such as a capacity of the battery 140, a cycle count of the battery 140, and a state of health (current leakage or impedance) of the battery 140. In some other embodiments, the power management module may be disposed in a processor of the circuit board 130. In some other embodiments, the power management module and the charging management module may be disposed in a same component.

When the mobile phone 200 is a flat-screen mobile phone, the display screen 110 may be an organic light-emitting diode (Organic Light-Emitting Diode, OLED) display screen, or may be a liquid crystal display (Liquid Crystal Display, LCD) screen. When the mobile phone 200 is a curved-screen mobile phone, the display screen 110 may be an OLED display screen. It should be understood that the display screen 110 may include a display and a touch component. The display is configured to output display content to a user, and the touch component is configured to receive a touch event entered by the user on the display screen 110.

Still referring to FIG. 1 and FIG. 2, the middle frame 120 may include a metal middle plate 121 and a frame 122, and the frame 122 is disposed around an outer circumference of the metal middle plate 121. Generally, the frame 122 may include a top edge 1221, a bottom edge 1222, a left edge 1223, and a right edge 1224, and the top edge 1221, the bottom edge 1222, the left edge 1223, and the right edge 1224 surround the frame 122 having a square ring structure.

A material of the metal middle plate 121 may include but is not limited to an aluminum plate, an aluminum alloy, stainless steel, a steel-aluminum composite die-casting plate, a titanium alloy, or a magnesium alloy. The frame 122 may be a metal frame 122, may be a ceramic frame 122, or may be a glass frame 122. When the frame 122 is a metal frame 122, a material of the metal frame 122 may include but is not limited to an aluminum alloy, stainless steel, a steel-aluminum composite die-casting plate, or a titanium alloy. The metal middle plate 121 and the frame 122 may be clamped, welded, bonded, or integrally formed, or the metal middle plate 121 and the frame 122 may be fixedly connected through injection molding.

The top edge 1221 is opposite to the bottom edge 1222, the left edge 1223 is opposite to the right edge 1224, the top edge 1221 is separately connected to one end of the left edge 1223 and one end of the right edge 1224 at a rounded corner, and the bottom edge 1222 is separately connected to the other end of the left edge 1223 and the other end of the right edge 1224 at a rounded corner, to jointly form a rounded rectangular region. A ground surface of a rear housing is disposed in the rounded rectangular region, and is separately connected to the top edge 1221, the bottom edge 1222, the left edge 1223, and the right edge 1224. It may be understood that the ground surface of the rear housing may be the rear cover 150 of the mobile phone 200.

The rear cover 150 may be a metal rear cover, may be a glass rear cover, may be a plastic rear cover, or may be a ceramic rear cover. In this embodiment of this application, a material of the rear cover 150 is not limited, and the foregoing example imposes no limitation.

It should be noted that, in some examples, the rear cover 150 of the mobile phone 200 may be connected to the frame 122 to form a unibody (Unibody) rear cover. For example, the mobile phone 200 may include the display screen 110, the metal middle plate 121, and a battery cover. The battery cover may be a unibody (Unibody) rear cover formed by the frame 122 and the rear cover 150. In this way, the circuit board 130 and the battery 140 are located in space surrounded by the metal middle plate 121 and the battery cover.

A component is disposed at the top and the bottom of the mobile phone 200. Therefore, in this embodiment of this application, the circuit board 130 may include a first circuit board and a second circuit board. The first circuit board and the second circuit board are electrically connected by using a first flexible circuit board or a lead. For example, the first circuit board may be located in an upper part of the middle frame 120, and the second circuit board may be located in a lower part of the middle frame 120. In this way, an interface disposed at the top and the bottom of the mobile phone 200 can be electrically connected to the circuit board 130. Certainly, in another example, that the circuit board may include the first circuit board and the second circuit board imposes no limitation. For example, the circuit board may include only the first circuit board, or may include only the second circuit board.

To implement a photographing function, the mobile phone 200 may further include a camera module. Still referring to FIG. 2, the camera module may include a front-facing camera module 160a and a rear-facing camera module 160b. The rear-facing camera module 160b may be disposed on a surface of the metal middle plate 121 that faces the rear cover 150, a hole 1101 is disposed on the display screen 110, and a lens of the rear-facing camera module 160b corresponds to the hole 1101. A mounting hole (not shown in the figure) that may be used to mount a partial region of the rear-facing camera module 160b may be disposed on the rear cover 150. Certainly, the rear-facing camera module 160b may be mounted on a surface of the rear cover 150 that faces the metal middle plate 121. The front-facing camera module 160a may be disposed on a surface of the metal middle plate 121 that faces the display screen 110, or the front-facing camera module 160a may be disposed on a surface of the metal middle plate 121 that faces the rear cover 150, or the front-facing camera module 160a may be disposed on a surface of the rear cover 150 that faces the display screen 110, and an opening that may be used to expose a lens end of the front-facing camera module 160a is disposed on the metal middle plate 121.

In this embodiment of this application, disposition locations of the front-facing camera module 160a and the rear-facing camera module 160b may include but is not limited to the foregoing descriptions. In some embodiments, there may be one or N front-facing camera modules 160a and rear-facing camera modules 160b that are disposed in the mobile phone 200, and N is a positive integer greater than 1.

In addition, a button such as a power button and a volume button is generally disposed on a side of the mobile phone 200, and the button is generally located on the side frame 122 of the middle frame 120. However, when the mobile phone 200 is limited by an appearance requirement, a thickness of the mobile phone 200 is tight, appearance space of the middle frame 120 of the mobile phone 200 is severely compressed, and a side button of the mobile phone 200 becomes a bottleneck for narrowing the middle frame 120. In a related technology, to prevent the side button of the mobile phone 200 from affecting a size of the middle frame 120 of the mobile phone 200, a design that a virtual side button replaces a physical side button is generally used. However, sensitivity of the virtual side button is low, and the virtual side button is prone to failure. This greatly affects user experience.

Figure 3:
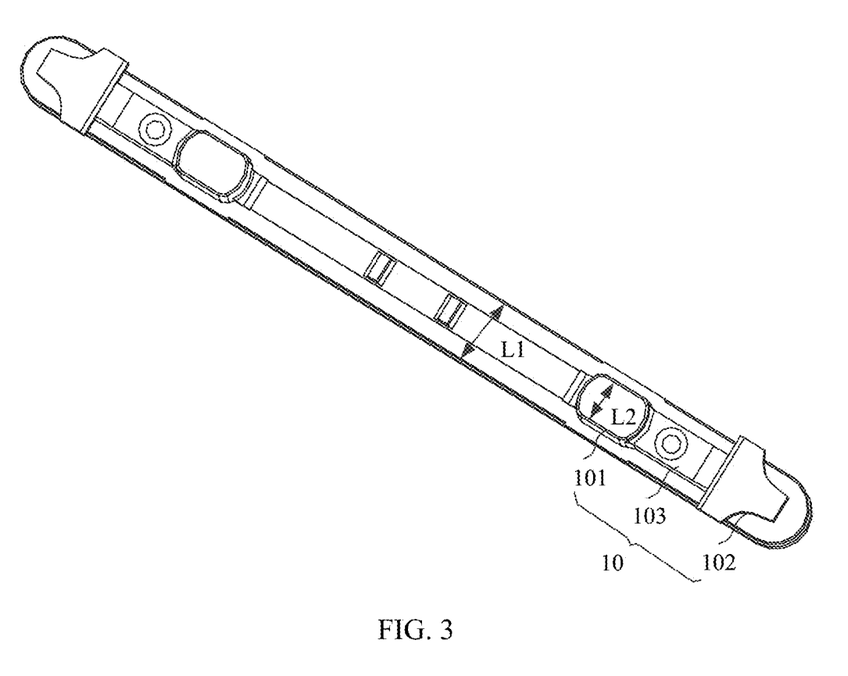
FIG. 3 is a schematic diagram of a structure of a button in a conventional technology.

Alternatively, in a conventional technology, to connect an inner button and an outer button of a button, a sealing location is generally reserved on a surface of the outer button 20 that faces the inner button 10. Therefore, as shown in FIG. 3, a width L1 of the outer button 20 of the button in the conventional technology is generally greater than a width L2 of a function part 101 of the inner button 10. In this case, an overall width of the button is at least the width of the outer button 20, and the overall width of the button is equal to a sum of a width (for example, 1.3 mm) of the inner button 10 and sealing widths (for example, 0.2 mm) on two sides, that is, the overall width of the button is greater than 1.5 mm. An excessively large width of the button greatly affects a size of the middle frame 120, and also affects lightening and thinning of the mobile phone 200.

Based on this, the embodiments of this application provide a button. An inner button is disposed on a back surface of an outer button, and a size of the outer button in a width direction of the button is the same as a size of at least a part of a function part of the inner button in the width direction of the button, that is, a side edge of the outer button is flush to a side edge of the at least a part of the function part of the inner button. Therefore, an overall width of the button can be reduced to a maximum degree. In this way, a size of the button in a thickness direction of an electronic device can be reduced, so that a design size of the button on a middle frame can be reduced, and an impact caused on a size of the middle frame of the electronic device can be reduced or eliminated, to help reduce a size of the middle frame in the thickness direction of the electronic device, and implement lightening and thinning of the entire electronic device. In addition, with the foregoing disposition, the following problem in a conventional technology can be avoided: When a virtualized fingerprint recognition button is used, the button is insensitive or even fails, and user experience is greatly affected.

The following uses a specific embodiment as an example to describe a specific structure of the electronic device with reference to the accompanying drawings.

Figure 4:
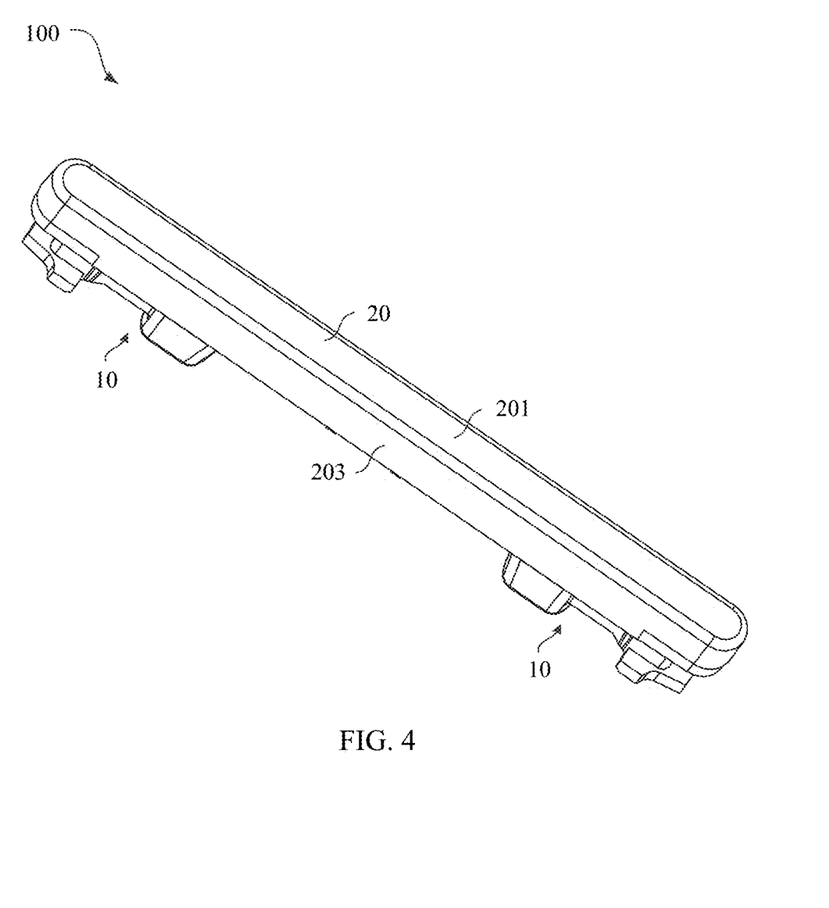
FIG. 4 is a schematic diagram of a structure of a button according to an embodiment of this application.
Figure 5:
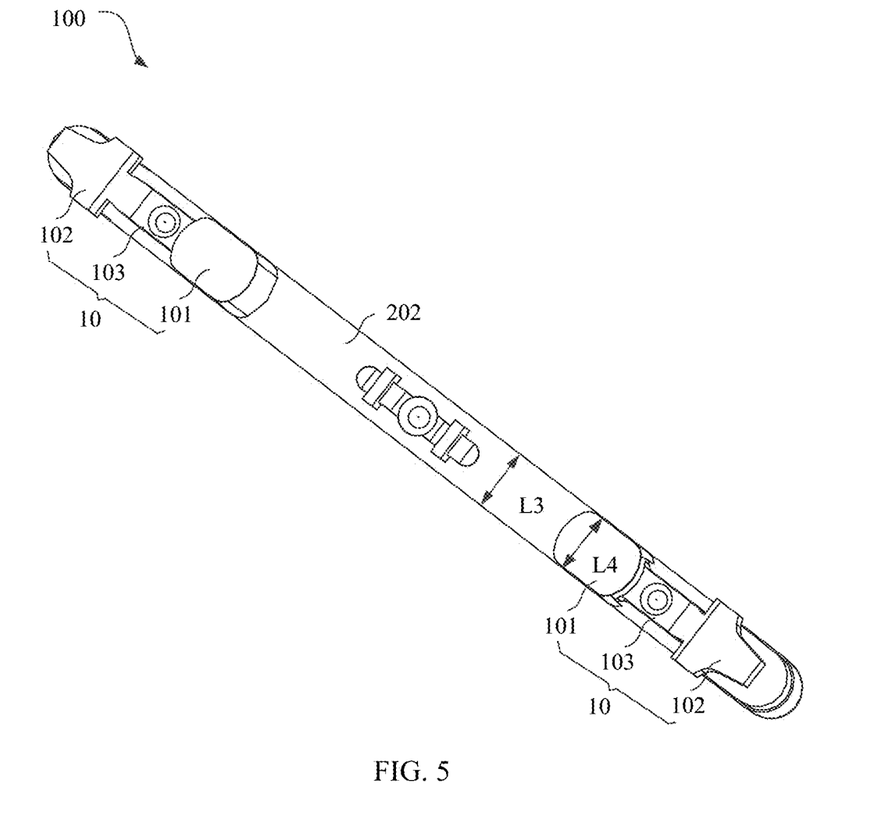
FIG. 5 is a schematic diagram of a structure of a button according to an embodiment of this application.

Referring to FIG. 4 and FIG. 5, an embodiment of this application provides a button 100. The button 100 may be applied to an electronic device (for example, a mobile phone 200). The button 100 may include at least an inner button 10 and an outer button 20. The outer button 20 may include a pressing surface 201 and a back surface 202. The pressing surface 201 is opposite to the back surface 202. The inner button 10 is disposed on the back surface 202 of the outer button 20.

The inner button 10 may be a soft rubber button, that is, a material used by the inner button 10 may be a soft rubber material. Specifically, the soft rubber may be formed through injection molding by using plastic, is soft to touch at a normal temperature, and is plastic whose material surface has low hardness. In an optional implementation, the soft rubber may be silica gel, for example, organic silica gel. The organic silica gel uses a silicon-oxygen (Si—O) bond as a main chain structure. Bond energy of a C—C bond is 82.6 kilocalories/gram molecule, and bond energy of the Si—O bond is 121 kilocalories/gram molecule in silicone. Therefore, thermal stability of the organic silica gel is high, and a chemical bond of molecules is not broken or decomposed at a high temperature (or during irradiation). The organic silica gel is high-temperature-resistant and low-temperature-resistant, and can be used in a wide range of temperatures. Both chemical and physical performance vary little with the temperature.

The outer button 20 may be a hard rubber button, that is, a material used by the outer button 20 may be a hard rubber material. The hard rubber is one of plastic materials for daily use, is a plastic material, and is hard, not durable, and easy to crack. The hard rubber contains thirty to forty percent of sulfur.

Specifically, the inner button 10 may include at least a function part 101. The function part 101 is used to cooperate with a volume control component (not shown in the figure) on a circuit board 130. In this way, when the function part 101 is in contact with the volume control component, the function part 101 can trigger a volume adjustment function of the volume control component.

It may be understood that a plurality of electronic components are generally disposed on the circuit board 130, and the circuit board 130 may supply power to the electronic component. For example, a volume control component, a processor, an antenna module, a Bluetooth module, a wireless fidelity (Wireless-Fidelity, WiFi) module, a global positioning system (Global Positioning System, GPS) module, a power supply, a charging module, or a camera operation module is generally disposed on the circuit board 130.

In this embodiment of this application, a size of the outer button 20 in a width direction of the button 100 may be the same as a size of at least a part of the function part 101 in the width direction of the button 100. Referring to FIG. 5, a width L3 of the outer button is the same as a width L4 of the function part.

Therefore, an overall width of the button 100 can be reduced to a maximum degree. In this way, a size of the button 100 in a thickness direction of the electronic device can be reduced, so that a design size of the button 100 on a middle frame can be reduced, and an impact caused on a size of the middle frame of the electronic device can be reduced or eliminated, to help reduce a size of the middle frame in the thickness direction of the electronic device, and implement lightening and thinning of the entire electronic device.

In addition, with the foregoing disposition, the following problem in a conventional technology can be avoided: When a virtualized fingerprint recognition button 100 is used, the button 100 is insensitive or even fails, and user experience is greatly affected.

It should be noted that, in this embodiment of this application, a cross section of the function part 101 of the inner button 10 may be a rectangle, a circle, an ellipse, a triangle, or the like. This is not limited in this embodiment of this application, and the foregoing example imposes no limitation. When the cross section of the function part 101 of the inner button 10 is a rectangle, the cross section of the function part 101 of the inner button 10 may be a right-angle rectangle, or may be a rounded rectangle shown in FIG. 5.

In this embodiment of this application, the outer button 20 may cooperate with one inner button 10. In this way, the outer button 20 may be pressed to trigger the inner button 10. In this case, the button 100 formed by the outer button 20 and the inner button 10 may be an on/off button.

Alternatively, in some embodiments, referring to FIG. 4, the outer button 20 may cooperate with two inner buttons 10. One of the two inner buttons 10 cooperates with one end of the outer button 20, and the other of the two inner buttons 10 cooperates with the other end of the outer button 20. In this way, the two ends of the outer button 20 may be pressed to separately trigger the two inner buttons 10. In this case, the button 100 formed by the outer button 20 and the two inner buttons 10 may be a volume button. Specifically, one of the two inner buttons 10 cooperates with the outer button 20 as a volume increase button, and the other of the two inner buttons 10 cooperates with the outer button 20 as a volume decrease button.

It may be understood that the inner button 10 may be electrically connected to the circuit board 130 by using a flexible circuit board (not shown in the figure). In some embodiments, the function part 101 of the inner button 10 may be electrically connected to the circuit board 130 by using the flexible circuit board.

In addition, in this embodiment of this application, at least a part of an end of the inner button 10 close to the outer button 20 may be built into the outer button 20. Specifically, the end of the inner button 10 close to the outer button 20 may be partially built into the outer button 20, or the end of the inner button 10 close to the outer button 20 may be totally built into the outer button 20.

The end of the inner button 10 close to the outer button 20 is partially built into the outer button 20, to ensure reliability when the inner button 10 cooperates with the outer button 20, and avoid separation between the inner button 10 and the outer button 20. Compared with the manner in which the end of the inner button 10 close to the outer button 20 is partially built into the outer button 20, the end of the inner button 10 close to the outer button 20 is totally built into the outer button 20, to ensure reliability to a larger degree when the inner button 10 cooperates with the outer button 20, and further avoid separation between the inner button 10 and the outer button 20.

In this embodiment of this application, one outer side wall of the outer button 20 in a length direction of the button 100 may be flush to one outer side wall of the function part 101 in the length direction of the button 100, and the other outer side wall of the outer button 20 in the length direction of the button 100 may be flush to the other outer side wall of the function part 101 in the length direction of the button 100.

The two outer side walls of the outer button 20 in the length direction of the button 100 are flush to the two outer side walls of the function part 101 of the inner button 10 in the length direction of the button 100, to ensure that the size of the outer button 20 in the width direction of the button 100 is the same as the size of the function part 101 of the inner button 10 in the width direction of the button 100. Therefore, the overall width of the button 100 can be reduced to a maximum degree. In this way, the size of the button 100 in the thickness direction of the electronic device can be reduced, and the design size of the button 100 on the middle frame can be reduced.

Figure 6:
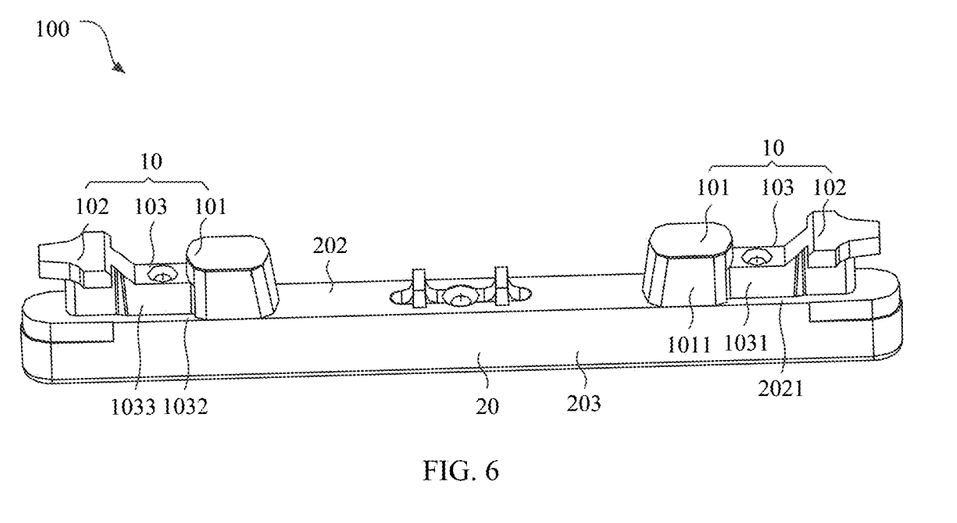
FIG. 6 is a schematic diagram of a structure of a button according to an embodiment of this application.

For example, referring to FIG. 6, the two outer side walls (namely, outer side walls 203 of the outer button) of the outer button 20 in the length direction of the button 100 are flush to the two outer side walls (namely, outer side walls 1011 of the function part) of the function part 101 of the inner button 10 in the length direction of the button 100.

Referring to FIG. 5 or FIG. 6, the inner button 10 may further include a first connection part 102, one end of the first connection part 102 is connected to the function part 101, and the other end of the first connection part 102 is connected to the middle frame 120 of the mobile phone 200. The first connection part 102 is disposed, so that the inner button 10 can be connected to the middle frame 120.

It should be noted that, in this embodiment of this application, the first connection part 102 may be a lug shown in FIG. 5 or FIG. 6, one end of the lug may be connected to the function part 101, and the other end of the lug may be connected to the middle frame 120 of the mobile phone 200. Specifically, the lug may be of a soft rubber material. The lug is connected to the middle frame 120, so that the inner button 10 can be connected to the middle frame 120, and the button 100 can be fastened to the middle frame 120.

Still referring to FIG. 5 or FIG. 6, the inner button 10 may further include a second connection part 103, one end of the second connection part 103 is connected to the function part 101, and the other end of the second connection part 103 is connected to the first connection part 102. The second connection part 103 can increase connection stability between the function part 101 and the first connection part 102.

In this embodiment of this application, a size of the second connection part 103 in the width direction of the button 100 may be less than or equal to a size of the function part 101 in the width direction of the button 100. In this way, it can be ensured that the function part 101 serves as a unit with a largest size in the inner button 10 in the width direction of the button 100, to prevent the second connection part 103 from further increasing an overall width of the inner button 10.

In addition, in some embodiments, a distance between the outer side wall of the function part 101 in the length direction of the button 100 and the outer side wall of the outer button 20 in the length direction of the button 100 may be less than a distance between an outer side wall of the second connection part 103 in the length direction of the button 100 and the outer side wall of the outer button 20 in the length direction of the button 100.

In other words, the size of the second connection part 103 in the width direction of the button 100 may be less than the size of the function part 101 in the width direction of the button 100. In this way, when the outer side wall (namely, the outer side wall 1011 of the function part) of the function part 101 in the length direction of the button 100 is flush to the outer side wall (namely, the outer side wall 203 of the outer button) of the outer button 20 in the length direction of the button 100, in the width direction of the button 100, an interval exists between the outer side wall of the second connection part 103 in the length direction of the button 100 and the outer side wall of the outer button 20 in the length direction of the button 100, and the interval forms, on a surface of the outer button 20 that faces the inner button 10, a step surface (namely, an exposed region 2021) for sealing.

For example, as shown in FIG. 5, a distance between the outer side wall 1031 of the second connection part and the outer side wall 203 of the outer button in the width direction of the button 100 is greater than a distance between the outer side wall 1011 of the function part and the outer side wall 203 of the outer button in the width direction of the button 100.

In this embodiment of this application, at least one gap 1032 may be disposed on at least one outer side wall of an end of the second connection part 103 close to the function part 101 in the length direction of the button 100, so that at least a part of the back surface 202 at a location at which the outer button 20 is opposite to the first connection part 102 is exposed. At least a part of the back surface 202 at the location at which the outer button 20 is opposite to the first connection part 102 is exposed, and a region (namely, the exposed region 2021) exposed on the back surface 202 of the outer button 20 may be used for sealing.

In the conventional technology, the width of the outer button 20 of the button is set to be greater than the width of the inner button 10 of the button, that is, a sealing location is reserved on a surface of the outer button 20 that faces the inner button 10, to perform sealing in an interval between the outer button 20 and the function part 101 of the inner button 10. In this solution, the sealing location is moved to a location between the second connection part 103 and the outer button 20. In this way, there is no need to reserve a sealing spacing at a location next to the function part 101. Therefore, the width of the outer button 20 may be set to be the same as the width of the function part 101 of the inner button 10.

It should be noted that, in this embodiment of this application, a bottom wall 1033 of the gap may be an inclined surface. The bottom wall 1033 of the gap is set as an inclined surface, so that feasibility of a sealing process can be increased.

In addition, it may be understood that, in this embodiment of this application, a size (namely, the width L3 of the outer button) of the outer button 20 in the width direction of the button 100 may be less than 1.5 mm. For example, the size of the outer button 20 in the width direction of the button 100 may be 1.45 mm, 1.4 mm, 1.35 mm, or 1.3 mm. This is not limited in this embodiment of this application.

In addition, a size (namely, the width L4 of the function part) of the function part 101 of the inner button 10 in the width direction of the button 100 may be less than 1.5 mm. For example, the size of the function part 101 of the inner button 10 in the width direction of the button 100 may be 1.45 mm, 1.4 mm, 1.35 mm, or 1.3 mm. This is not limited in this embodiment of this application.

It should be noted herein that a value and a value range in this application are approximate values, and an error in a range may exist due to an impact of a manufacturing process. Persons skilled in the art may ignore the error.

It should be noted that, in this embodiment of this application, the button 100 may be a volume button, or the button 100 may be an on/off button. Alternatively, the electronic device 200 may have two buttons 100 (referring to FIG. 2). One button 100 of the two buttons 100 may be an on/off button, the other button 100 of the two buttons 100 may be a volume button, and two ends of the volume button may be respectively used as a volume increase button and a volume decrease button.

Alternatively, the electronic device 200 may have three buttons 100, one button 100 of the three buttons 100 may be an on/off button, another button 100 of the three buttons 100 may be a volume increase button, and still another button 100 of the three buttons 100 may be a volume decrease button.

In this embodiment of this application, the button 100 may further include at least one button switch (not shown in the figure). The button switch may be electrically connected to the flexible circuit board, and the button switch cooperates with the button 100. Specifically, the button switch cooperates with the inner button 10 of the button 100. In this way, the button switch may be triggered by pressing or touching the button 100. In addition, the button switch is electrically connected to the flexible circuit board, and the flexible circuit board is electrically connected to the circuit board 130, so that an electrical connection between the button switch and the circuit board 130 can be ensured, so as to ensure use performance of the button 100.

In addition, it may be understood that, in this embodiment of this application, there may be three button switches, and the three button switches are respectively a first button switch, a second button switch, and a third button switch. The first button switch, the second button switch, and the third button switch may be all electrically connected to the flexible circuit board, and the first button switch, the second button switch, and the third button switch all cooperate with the button 100.

The first button switch, the second button switch, and the third button switch are electrically connected to the flexible circuit board, and the flexible circuit board is electrically connected to the circuit board, so that an electrical connection between the circuit board and each of the first button switch, the second button switch, and the third button switch is ensured, so as to ensure use performance of the first button switch, the second button switch, and the third button switch.

The first button switch is used to control the mobile phone 200 to be powered on or off. The second button switch and the third button switch are used to control a volume of the mobile phone 200. Specifically, the second button switch may be used to increase the volume of the mobile phone 200, and the third button switch may be used to decrease the volume of the mobile phone 200.

In some embodiments, there may be two buttons 100 in the mobile phone 200, one button 100 of the two buttons 100 may be a power button, and the other button 100 of the two buttons 100 may be a volume button. The power button may be opposite to the first button switch, and two ends of the volume button may be respectively opposite to the second button switch and the third button switch. Specifically, the two ends of the volume button may be respectively used as a volume increase button and a volume decrease button, the volume increase button is opposite to the second button switch, and the volume decrease button is opposite to the third button switch.

Alternatively, in some other embodiments, there may be three buttons 100 in the mobile phone 200, one button 100 of the three buttons 100 may be a power button, and the other two buttons 100 of the three buttons 100 each may be a volume button. The power button may be opposite to the first button switch, and the two volume buttons may be respectively opposite to the first button switch and the second button switch. Specifically, the two volume buttons may be respectively a volume increase button and a volume decrease button, the volume increase button is opposite to the second button switch, and the volume decrease button is opposite to the third button switch.

In this embodiment of this application, at least two openings 1225 (referring to FIG. 1) may be disposed on the frame 122, and the button 100 may be located at the opening 1225. For example, referring to FIG. 1 and FIG. 2, the two buttons 100 may penetrate through the two openings 1225, and an end of each of the two buttons 100 opposite to the frame 122 may be exposed.

In an optional implementation, the opening 1225 may be disposed on one of the left edge 1223 and the right edge 1224. An example in which two openings 1225 are disposed on the frame 122 is used. The opening 1225 may be located on the left edge 1223, or may be located on the right edge 1224. Alternatively, one opening 1225 of the two openings 1225 may be located on the left edge 1223, and the other opening 1225 of the two openings 1225 may be located on the right edge 1224. This is not limited in this embodiment of this application, and the foregoing example imposes no limitation.

Certainly, in some other embodiments, three openings 1225 may be disposed on the frame 122. The three openings 1225 may be all located on the left edge 1223, or the three openings 1225 may be all located on the right edge 1224, or one opening 1225 of the three openings 1225 may be located on the left edge 1223 and the other two openings 1225 of the three openings 1225 may be located on the right edge 1224. This is not limited in this embodiment of this application, and the foregoing example imposes no limitation.

It may be understood that the structures illustrated in the embodiments of this application do not constitute a specific limitation on the mobile phone 200. In some other embodiments of this application, the mobile phone 200 may include more or fewer components than those shown in the figure, or combine some components, or split some components, or have different component arrangements. For example, the mobile phone 200 may further include components such as a flash. The components shown in the figure may be implemented by hardware, software, or a combination of software and hardware.

In the descriptions of the embodiments of this application, it should be noted that unless otherwise specified or limited, terms "mount", "communicate", and "connect" shall be understood in a broad sense, for example, may be a fixed connection, may be an indirect connection by using an intermediate medium, or may be a connection between the inside of two elements or an interaction relationship between two elements. Persons of ordinary skill in the art may understand specific meanings of the foregoing terms in the embodiments of this application based on a specific situation.

In the embodiments of this application or by implication, directions or position relationships are not intended to indicate or imply that an indicated apparatus or element needs to have a specific direction or be constructed and operated in a specific direction, and therefore cannot be understood as a limitation on the embodiments of this application. In the descriptions of the embodiments of this application, unless otherwise specified specifically, "a plurality of" means two or more than two.

In the specification, claims, and accompanying drawings of embodiments of this application, the terms "first", "second", "third", "fourth", and so on (if existent) are intended to distinguish between similar objects but do not necessarily indicate a specific order or sequence. It should be understood that the data used in such a way is interchangeable in a proper circumstance, so that the embodiments of this application described herein can be implemented in an order other than the order illustrated or described herein. Moreover, the terms "include", "contain", and any other variants thereof mean to cover non-exclusive inclusion, for example, a process, method, system, product, or device that includes a list of steps or units is not necessarily limited to those expressly listed steps or units, but may include other steps or units not expressly listed or inherent to such a process, method, product, or device.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A button, applied to an electronic device and comprising at least:

an inner button and an outer button, wherein at least a part of an end of the inner button close to the outer button is built into the outer button;

the outer button comprises a pressing surface and a back surface opposite to the pressing surface, and the inner button is disposed on the back surface of the outer button;

the inner button comprises at least a function part, and a size of the outer button in a width direction of the button is the same as a size of at least a part of the function part in the width direction of the button; and one outer side wall of the outer button in a length direction of the button is flush to one outer side wall of the function part in the length direction of the button, and the other outer side wall of the outer button in the length direction of the button is flush to the other outer side wall of the function part in the length direction of the button.

2. The button according to claim 1, wherein the inner button further comprises a first connection part; and one end of the first connection part is connected to the function part, and the other end of the first connection part is connected to a middle frame of the electronic device.

3. The button according to claim 2, wherein the inner button further comprises a second connection part, one end of the second connection part is connected to the function part, and the other end of the second connection part is connected to the first connection part.

4. The button according to claim 3, wherein a size of the second connection part in the width direction of the button is less than or equal to a size of the function part in the width direction of the button.

5. The button according to claim 4, wherein a distance between the outer side wall of the function part in the length direction of the button and the outer side wall of the outer button in the length direction of the button is less than a distance between an outer side wall of the second connection part in the length direction of the button and the outer side wall of the outer button in the length direction of the button.

6. The button according to claim 3, wherein at least one gap is disposed on at least one outer side wall of an end of the second connection part close to the function part in the length direction of the button, so that at least a part of the back surface at a location at which the outer button is opposite to the first connection part is exposed.

7. The button according to claim 6, wherein a bottom wall of the gap is an inclined surface.

8. The button according to claim 1, wherein the size of the outer button in the width direction of the button is less than 1.5 mm.

9. An electronic device, comprising at least a middle frame, a circuit board, a flexible circuit board, and at least one button, wherein the button comprises an inner button and an outer button; at least a part of an end of the inner button close to the outer button is built into the outer button; the outer button comprises a pressing surface and a back surface opposite to the pressing surface, and the inner button is disposed on the back surface of the outer button; the inner button comprises at least a function part, and a size of the outer button in a width direction of the button is the same as a size of at least a part of the function part in the width direction of the button; and one outer side wall of the outer button in a length direction of the button is flush to one outer side wall of the function part in the length direction of the button, and the other outer side wall of the outer button in the length direction of the button is flush to the other outer side wall of the function part in the length direction of the button;
the inner button of the button is connected to the middle frame;
and the inner button is electrically connected to the circuit board by using the flexible circuit board.

10. The electronic device according to claim 9, wherein the electronic device further comprises at least one button switch, the button switch is electrically connected to the flexible circuit board, and the button switch cooperates with the button.

11. The electronic device according to claim 10, wherein there are two buttons, and one of the buttons is opposite to one of the button switches; and
two ends of the other of the buttons are respectively opposite to the two button switches.

12. The electronic device according to claim 9, wherein the middle frame comprises a middle plate and a frame connected to the middle plate; and
at least one opening is disposed on the frame, and the button is located at the opening.

13. The electronic device according to claim 12, wherein the frame comprises a top edge, a bottom edge, a left edge, and a right edge that are connected to each other; and
the opening is disposed on one of the left edge and the right edge.

14. The electronic device according to claim 9, wherein the inner button further comprises a first connection part; and
one end of the first connection part is connected to the function part, and the other end of the first connection part is connected to a middle frame of the electronic device.

15. The electronic device according to claim 14, wherein the inner button further comprises a second connection part, one end of the second connection part is connected to the function part, and the other end of the second connection part is connected to the first connection part.

16. The electronic device according to claim 15, wherein a size of the second connection part in the width direction of the button is less than or equal to a size of the function part in the width direction of the button.

17. The electronic device according to claim 16, wherein a distance between the outer side wall of the function part in the length direction of the button and the outer side wall of the outer button in the length direction of the button is less than a distance between an outer side wall of the second connection part in the length direction of the button and the outer side wall of the outer button in the length direction of the button.

18. The electronic device according to claim 15, wherein at least one gap is disposed on at least one outer side wall of an end of the second connection part close to the function part in the length direction of the button, so that at least a part of the back surface at a location at which the outer button is opposite to the first connection part is exposed.

19. The electronic device according to claim 18, wherein a bottom wall of the gap is an inclined surface.

20. The electronic device according to claim 9, wherein the size of the outer button in the width direction of the button is less than 1.5 mm.

* * * * *